United States Patent [19]

Cerefice et al.

[11] 4,220,753

[45] Sep. 2, 1980

[54] ALKYL ALKOXYMETHYLBENZOATES

[75] Inventors: Steven A. Cerefice, Naperville; Edward E. Paschke, Wheaton, both of Ill.

[73] Assignee: Standard Oil Company (Indiana), Chicago, Ill.

[21] Appl. No.: 970,223

[22] Filed: Dec. 18, 1978

[51] Int. Cl.² .................... C08G 63/06; C08G 65/26; C07C 65/13
[52] U.S. Cl. ........................... 528/302; 260/465 F; 528/100; 528/310; 528/361; 528/408; 528/421; 560/29; 560/64; 560/65; 562/451; 562/459; 562/473
[58] Field of Search ............... 560/64, 65, 29; 562/473, 451, 459; 528/421, 408, 361, 100, 310, 302; 260/465 F

[56] References Cited

U.S. PATENT DOCUMENTS

| 2,692,248 | 10/1954 | Lincoln | 260/42 |
| 3,219,692 | 11/1965 | Petrie | 260/521 |
| 3,316,296 | 4/1967 | Mihara | 260/521 |
| 3,534,089 | 10/1970 | Wolfes et al. | 260/521 |

Primary Examiner—Earl A. Nielsen
Attorney, Agent, or Firm—William C. Clarke; William T. McClain; William H. Magidson

[57] ABSTRACT

Alkyl alkoxymethylbenzoates and essentially linear polyester ethers and copolyester ethers therefrom.

21 Claims, No Drawings

ALKYL ALKOXYMETHYLBENZOATES

BACKGROUND OF THE INVENTION

This invention relates to a new family of compositions of matter having the structural formula

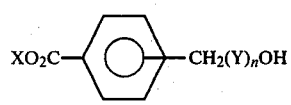

wherein X is hydrogen or an alkyl group of one to 24 carbon atoms or a hydroxy alkyl group of two to 24 carbon atoms and Y is selected from the group consisting of —OCHR'CHR''—, —OCH$_2$CHR'CHR''—, —OCH$_2$CHR'CH$_2$CHR''— and —OCH$_2$CHR'CHR''CH$_2$— wherein R' and R'' are the same or different and individually selected from the group consisting of H, an alkyl group of one to six carbon atoms, an aralkyl group of at least one benzene ring to which is attached an alkyl group of one to six carbon atoms, and an aryl group of at least one benzene ring, and n is a number of from 1 to 100. More particularly, it relates to the p- and m- isomers of methyl (2-hydroxyethoxy)methylbenzoate and to essentially linear polyesters and copolyesters of these materials.

These compounds, including the monomers, polymers and copolymers are derivatives of p- and m-hydroxymethylbenzoic acid, the methyl ester of which acid is disclosed in commonly assigned application Ser. No. 701,902 now U.S. Pat. No. 4,130,719, filed July 1, 1976, which is incorporated herein by reference. A similar procedure can be used to prepare ethyl and higher analogues. The acid where H is X can be prepared by saponification of the ester wherein X is an alkyl group.

Although epoxide derivatives of alcohols are known in the prior art, to the best of our knowledge, epoxide adducts of methyl p- and m-hydroxymethylbenzoate are heretofore unknown. Although *Chem. Abstracts*, 84:75582j, Vol. 84, 1976, indicated that Japanese Pat. No. 132061/75, discloses that poly(ether esters) fibers were improved by the addition of p-(β-oxyethoxy)-methyl benzoate, it is clear from Japanese Pat. No. 132061/75 that the methyl ester of p-(β-oxyethoxy)benzoic acid referred to has the structure

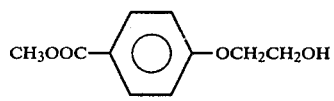

which is well-known in the prior art. These compositions do not contain the methylene group between the benzene ring and the alkoxy group. Homopolyesters of the methyl ester of p(β-oxyethoxy)benzoate, or poly(p-2-ethyleneoxybenzoate), demonstrate a high melting point, the Tm being 210°–225° C., a glass transition point (Tg) of 84° C., the tenacity being 3.8 gms/denier when drawn into a fiber but the fibers relax or shrink in boiling water (Goodman, I., Rhys, J. A., *Polyesters*, 1, Am. Elsevier, N.Y., 1963, p. 70) (British Pat. No. 660,883). In contrast, the polyester compositions of the instant invention have novel and unexpected physical properties. The p-2-hydroxyethoxymethylbenzoate homopolyester and copolymers with hydroxy methylbenzoate esters are transparent rubber-like elastomers at room temperature, useful as thermoplastic elastomers.

SUMMARY OF THE INVENTION

Alkyl alkoxymethylbenzoates and essentially linear polyester ethers and copolyester ethers derived therefrom.

DETAILED DESCRIPTION OF THE INVENTION

The compositions of this invention are adducts of alkyl p- and m-hydroxymethylbenzoate esters wherein the adduct is selected from the group consisting of ethylene oxide, trimethylene oxide, furan and derivatives, tetrahydrofuran, propylene oxide and other epoxides of the general formula

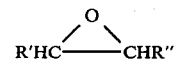

wherein R' and R'' are the same or different and are individually selected from the group consisting of hydrogen, an alkyl group of one to ten carbon atoms, an aralkyl group of at least one benzene ring and an alkyl group of one to ten carbon atoms and an aryl group of at least one benzene ring and wherein the alkyl group of the alkylbenzoate contains one to 24 carbon atoms, from methyl to tetracosane groups. Hydrogen is preferred over other moieties. The alkyl moieties can be methyl, ethyl, propyl, butyl, isopropyl, n-butyl, sec-butyl, tertiary butyl, amyl, and hexyl, etc. Of these groups, the methyl group is preferred. The alkyl moieties can be substituted and unsubstituted. Since the reaction site between the epoxide and the methyl m- and p-hydroxymethylbenzoate involves only the epoxide ring moiety and the hydroxymethylene moiety, the remainder of the epoxide molecule can be substituted with any substituents that do not interfere with the course of the reaction between the epoxide and the alcohol. The p- and m-alkoxymethylbenzoic acids can also be used if the acid group is protected by esterification.

Compounds other than epoxides that react with alcohols by a ring opening mechanism to give a hydroxyalkylether also can be employed and accordingly furan and others as above can be used. These when reacted with methyl p- and m-hydroxymethylbenzoate yield monomers containing ether functionalities suitable to form polyester ethers.

In somewhat greater detail, the new compounds of this invention can be prepared by heating a vicinal epoxide compound with an alkyl p- and m-hydroxymethylbenzoate such as methyl p-,m-hydroxymethylbenzoate either alone or in the presence of an oxirane ring opening catalyst. The predominant reaction is the opening of the epoxy ring with the formation of an isomeric mixture of vicinal substituted derivatives depending upon the epoxide used. For example, methyl p-hydroxymethylbenzoate reacts with an epoxide compound as follows:

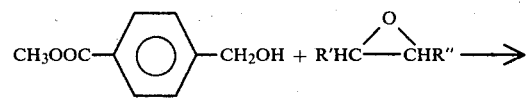

-continued

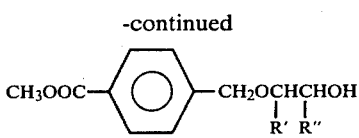

wherein R' and R" are hydrogen or a monovalent aliphatic group of one to 24 carbon atoms, or a cycloalkyl group of one to 24 carbon atoms or an aryl group of from 6 to 18 carbon atoms, or an aralkyl group of seven to 24 carbon atoms.

While the equation shows the formation of a single compound an isomeric mixture typically results since both of the carbon-oxygen bonds in the oxirane ring are commonly obtained. In those cases where R' and R" are not the same, the reaction mixture contains two isomeric epoxy derivatives.

Since the addition of an epoxide to an alcohol gives a mixture, the products are mono-, di-, tri- and higher analogues. Accordingly, n in the structural formula

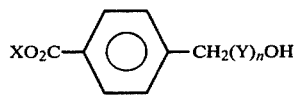

can be a number from about one to 100 depending upon the mole ratios of epoxide to alcohol wherein the greater numerical ratios result from an increased mole ratio of epoxide to alcohol. A preferred mole ratio of alcohol to epoxide is from about 1:1 to about 1:10 with the epoxide being present in the greater quantity. The mixture can be polymerized directly to form useful polymers, or the mixture can be separated by known techniques into individual components which can then be polymerized.

Epoxy compounds which can be utilized in this invention can be represented by the following formula

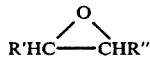

wherein R' and R" are hydrogen or a monovalent aliphatic group of from one to 24 carbon atoms. The R' and R" groups can be substituted with substituents selected from the group consisting of hydroxyl, halo, nitrilo, amino, carbonyl, carbamato, carboxyl, acyloxy, alkoxy, aryloxy and carboxylate substituents. The presence of groups in the epoxy compound which are reactive with the epoxy group at elevated temperatures such as hydroxyl, amino, carboxyl and amide groups may lead to side reactions during the epoxide hydrolysis reaction.

The following are representative of some of the compounds containing the oxirane ring which can be used in this invention: ethylene oxide, propylene oxide, butylene oxide, styrene oxide, 4,5-epoxydecane; 9,10-epoxyoctadecane; 1,10-epoxytetracosane; 8,9-epoxy-1-hydroxydecane; 9,10-epoxy-1-hydroxy-octadecane; 9,10-epoxy-6-hydroxy-tetracosane; 4,5-epoxy-1-chlorodecane; 9,10-epoxy-1-bromooctadecane; 9,10-epoxy-1-chlorotetracosane; 4,5-epoxy-1-nitrilodecane; 9,10-epoxy-1-nitrilooctadecane; 9,10-epoxy-1-nitrilotetracosane; 4,5-epoxy-1-aminodecane; 9,10-epoxy-1-methylaminooctadecane, 9,10-epoxy-1-dioctylaminotetracosane; 4,5-epoxy-1-carbamyldecane; 9,10-epoxy-N-ethyl-1-carbamyloctadecane; 9,10-epoxy-N-dioctyl-1-carbamyltetracosane; 4,5-epoxycapric acid; 9,10-epoxystearic acid; 9,10-epoxyricinoleic acid; 9,10-epoxypentacosic acid; 4,5-epoxy-dectyl-1-acetate; 9,10-epoxystearyl stearate; 9,10-epoxy-1-phenoxyoctadecane, 9,10-epoxy-1-propoxyoctadecane; etc. The preferred compound is ethylene oxide because of availability and cost.

The following catalysts are representative of catalysts useful in oxirane-ring oxyalkylation reactions which can be used in an amount equal to 0.001 to 0.1 mole per equivalent of oxirane in the epoxy compound: alkali and alkaline earth oxides, hydroxides and alkoxides, tertiary aliphatic amines, sodamide, zinc oxide, stannic chloride, boron trifluoride (and other Lewis acids), p-toluene sulfonic acids, sulfuric acid (and other Bronsted acids) etc. Other specific catalysts are molybdenum oxides and salts; tungsten oxides and salts; sodium methoxide, and sodium phenolate. The reactions are generally carried out under pressure (10 to 200 psig; generally 20 to 50 psig) in order to contain the volatiles and to shorten the reaction time. Temperatures used are in the range of 120° to 200° C. when basic catalysts are used, or 50° to 70° C. when Lewis acids are employed. Preferred catalysts are molybdenum trioxide, $MoO_3$, (0.1 to 10 wt %) and sodium methoxide, $NaOCH_3$, (0.1 to 5.0 wt %) because of effectiveness, easy availability and cost.

The epoxide hydrolysis reaction can be carried out in the presence of a solvent which is compatible with the hydrolysis reaction as well as stable under reaction conditions, although the reaction is preferably carried out without a solvent. Aromatic chlorinated aliphatic and ether solvents having a boiling point greater than 20° C. are preferred. Examples of such solvents are benzene, chlorobenzene, toluene, tetrahydrofuran, and carbon tetrachloride. If used, the preferred solvents are benzene and carbon tetrachloride. The epoxide hydrolysis reaction product and catalyst are separated by filtration. The epoxide hydrolysis product is recovered from the solvent by fractional distillation. If no solvent is used, recovery requires filtration and distillation from the alcohol byproduct.

The polymers of this invention can be characterized as essentially linear, alternating (as contrasted with block) polyesters comprising units of alkyl (2-ethoxyalkyl)benzoate wherein the alkyl group is defined as given above for R' and R". Being that the polymers are alternating linear polymers, the polymer typically has the properties of an elastomer, as of rubber. The polymers of Japanese Pat. No. 132061/75, for example, being block polymers, are typically not elastomeric.

The polymers of this invention can also be copolymers of a polyhydroxy component, a polycarboxylic component, as well as an epoxide adduct of methyl p- and m-hydroxymethylbenzoate or an epoxide adduct of p- and m-hydroxymethylbenzoic acid. The epoxide adduct can be a single component or a mixture of components such as a mixture of mono, di and tri adducts. Typical examples of polyhydroxy components are ethylene glycol, 1,4-butanediol, aliphatic diols containing 2 to 24 carbons and bisphenol A. Typical examples of polycarboxylic acid components are adipic acid and aliphatic diacids containing 2 to 24 carbons and aromatic diacids such as terephthalic acid, isophthalic acid and phthalic acid. The preferred embodiments are terephthalic acid, ethylene glycol and p-(2-hydroxyethoxymethyl)benzoic acid.

A convenient method of preparing the polyesters of this invention comprises reacting the methyl (2-ethoxyalkyl)benzoate monomers derived from the epoxide by the hydrolysis reaction already described in an transalcoholysis reaction. The transalcoholysis reaction can be carried out at atmospheric pressure but higher or lower pressure may be used if desired. A range is usually from 0.1 to ten atmospheres. Temperature range is usually from 90° C. to 325° C. Following the transalcoholysis reaction, in which methanol is removed as a by-product, heating is continued at an increased temperature to bring about polycondensation. Small amounts of catalysts are usually added to facilitate the reaction, manganous acetate, calcium acetate, and sodium methoxide being typical transalcoholysis catalysts and antimony trioxide, dibutyltin maleate, and zinc acetate being suitable polycondensation catalysts. Litharge, sodium hydrogen hexabutoxytitanate and the tetraalkyl titanates, such as tetraisopropyl titanate, are examples of catalysts which can be used for both the transalcoholysis and the polycondensation steps. Normally, the polycondensation reaction is continued until a degree of polymerization is achieved corresponding to an inherent viscosity of approximately at least 0.20 dl/g in a 60/40 phenol-tetrachloroethane solvent at 30° C.

To achieve a higher degree of polymerization, the product of the polycondensation reaction is allowed to cool to room temperature, about 20° to 25° C., following which the product is heated below its melting point in a stream of inert gas to achieve solid phase polycondensation.

Embodiments of the instant invention can be found in the following examples. These embodiments and examples are presented for purposes of illustration only and are not intended to limit the scope of the invention.

EXAMPLE I

This example illustrates the preparation of methyl p(2-hydroxyethoxy)methylbenzoate. 19.9 grams (0.12 mole) of methyl p-hydroxymethylbenzoate, 7.9 grams (0.18 mole) ethylene oxide and 2.0 grams of $MoO_3$ were combined in a 100 ml Fischer-Porter Bomb at room temperature of 25° C. The bomb was equipped with an electric heating mantle, a thermometer and means for stirring the mixture. Over a period of 30 to 60 minutes, the temperature was raised to 140°–150° C. with stirring. Pressure in the bomb rose to 80 psig at 150° C. then dropped to 6 psig after 60 minutes. The contents of the bomb were removed from the bomb and filtered to remove the $MoO_3$. Fractional distillation of the filtrate yielded methyl p(2-hydroxyethoxy)methylbenzoate which boiled at 150°–152° C./0.02 mm Hg. The product was a colorless, mobile liquid which was characterized by its infrared and mass spectra (exact mass 210.0868; calculated for $C_{11}H_{14}O_{14}$: 210.0892; and by elemental analysis.

Anal.: Calculated for $C_{11}H_{14}H_4$: C, 62.8; H, 6.7. Found: C, 62.2; H, 6.7.

EXAMPLE II

This example illustrates the preparation of methyl p(2-hydroxyethoxy)methylbenzoate with use of a solvent. A mixture of 16.6 grams (0.10 mole) of methyl p-hydroxymethylbenzoate, 4.4 grams (0.10 mole) ethylene oxide; 0.54 grams sodium methoxide in 50 ml of benzene were combined at room temperature of 25° C. in a 100 ml Fischer-Porter Bomb. The temperature was increased with stirring and held at 60°–64° C. for 21 hours. The bomb was thereupon cooled to room temperature, the contents of the bomb were diluted with 100 ml of water and the organic product extracted by means of the benzene solvent. The benzene solution was washed with water, dried over anhydrous magnesium sulfate and stripped of solvent using a rotary evaporator. The remaining material, after the stripping of the solvent, 11.9 grams, consisted of 26% methyl p-hydroxymethylbenzoate, 57.5% methyl p(2-hydroxyethoxy)methylbenzoate and 16.5% the adduct of two moles of ethylene oxide with methyl p-hydroxymethylbenzoate.

EXAMPLE III

The conditions of Example II were repeated with 0.5 grams sodium methoxide without use of the benzene solvent. The mixture was heated in the Fischer-Porter Bomb at a temperature within the range of 80° to 83° C. for 16 hours. 100 ml carbon tetrachloride were then added to extract the organic portion. The carbon tetrachloride extract was washed with water, dried with anhydrous magnesium sulfate and stripped of solvent. The remaining material, 18.58 grams, after the stripping of the solvent consisted of 41% methyl p-hydroxymethylbenzoate, 48% methyl p(2-hydroxyethoxy)methylbenzoate, 8% the adduct of two moles of ethylene oxide with methyl p-hydroxymethylbenzoate and 1% of the adduct of three moles of ethylene oxide with methyl p-hydroxymethylbenzoate. Analysis was by gas chromatograph, nuclear magnetic resources and infrared.

EXAMPLE IV

This example illustrates the production of polyester containing methyl p(2-hydroxyethoxy)methylbenzoate moieties. 1.5 grams methyl p(2-hydroxyethoxy)methylbenzoate mixed with 0.01 grams zinc acetate and 0.01 grams calcium acetate were heated at 160° C. for 120 minutes in a test tube equipped with a nitrogen bubbler and a side-arm. During the heating, nitrogen was passed slowly through the mixture. After two hours the temperature was raised to 210° C. and 0.05 grams dibutyltin maleate was added. A partial vacuum was pulled on the mixture over a period of 10 to 15 minutes, using a vacuum pump attached to the side-arm. The temperature was raised to 275° C. When this temperature was reached, full vacuum (0.9 mm Hg) was applied and the reaction continued for 133 minutes to obtain low molecular weight polymer. The polymer had an inherent viscosity of 0.27 deciliters per gram (dl/g), as determined in a 60/40 phenol-tetrachloroethane mixed solvent at 30° C.

EXAMPLE V

The procedure of Example IV was repeated using mixtures of methyl p-hydroxymethylbenzoate, methyl p-(2-hydroxyethoxy)methylbenzoate, the mono adduct, and the adduct of two moles of ethylene oxide with methyl p-hydroxymethylbenzoate, the di-adduct, and the adduct of three moles of ethylene oxide with methyl p-hydroxymethylbenzoate, the tri-adduct. The resulting inherent viscosities and thermal properties are shown in the following table.

Table I

| Sample | Methyl P-hydroxy-methyl benzoate | Composition - Mole % Adducts of Ethylene Oxide With Methyl p-hydroxymethyl-benzoate | | | I.V. (dl/g) | Tg°C. | Tm°C. |
|---|---|---|---|---|---|---|---|
| | | Mono | Di | Tri | | | |
| Control | 100 | 0 | 0 | 0 | 0.87 | 94 | 255 |
| 1 | 83 | 16 | 0 | 0 | 0.36 | 65 | —[a] |
| 2 | 41 | 50 | 8 | 1 | 0.27 | 23 | —[a] |
| 3 | 0 | 100 | 0 | 0 | 0.27 | 11 | 100 |

[a] none observed

EXAMPLE VI

This example illustrates the preparation of a copolymer of ethylene glycol, methyl p(hydroxyethoxy)methylbenzoate and dimethyl terephthalate according to the procedure of Example IV. A suitable molar weight of methyl p(2-hydroxyethoxy)methylbenzoate mixed with a suitable molar weight dimethyl terephthalate is mixed with the necessary molar weight of ethylene glycol. Catalysts zinc acetate and calcium acetate are added at reaction temperatures. The mixture is heated in a container equipped with a nitrogen bubbler and a side-arm. After initial polymerization occurs, the temperature is raised and the dibutyltin maleate catalyst is added. A partial vacuum is pulled on the mixture using a vacuum pump attached to the side-arm. The temperature is further raised and full vacuum is applied. The reaction is continued for a sufficient period to obtain high molecular weight copolymer.

What is claimed is:

1. Compositions of matter of the formula

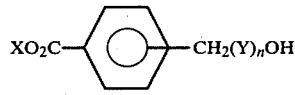

wherein X is selected from the group consisting of hydrogen, an alkyl group of 1 to 24 carbon atoms and a hydroxyl alkyl group of 2 to 24 carbon atoms, and Y is selected from the group consisting of —OCHR'CHR"—, —OCH$_2$CHR'CHR"—, —OCH$_2$CHR'CH$_2$CHR"—, and —OCH$_2$CHR'CHR"CH$_2$—, wherein R' and R" are the same or different and are individually selected from the group consisting of H, an alkyl group of one to six carbon atoms, an aralkyl group of at least one benzene ring to which is attached an alkyl group of one to six carbon atoms, and an aryl group of at least one benzene ring wherein n is a number from about 1 to 100.

2. The composition of claim 1 wherein the said composition is an epoxide adduct selected from the group consisting of methyl p- and m,-hydroxymethylbenzoate and mixtures thereof.

3. The composition of claim 2 wherein the said epoxide is

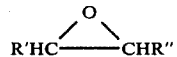

wherein each R' and R" are individually selected from the group consisting of hydrogen and monovalent aliphatic groups of one to 24 carbon atoms, the said aliphatic groups being substituted or unsubstituted, the said substitutions being selected from the group consisting of hydroxyl, halo, nitrilo, amino, carbonyl, carbamato, carboxyl, aryloxy and carboxylate substituents.

4. The composition of claim 3 wherein the said epoxide is selected from the group consisting of ethylene oxide, propylene oxide, butylene oxide and styrene oxide.

5. The compositions of claim 1 wherein the said compositions comprise methyl p- and m,-(2-hydroxyethoxy)methylbenzoate.

6. The composition of claim 1 which comprises methyl p(2-hydroxyethoxy)methylbenzoate.

7. The composition of claim 1 which comprises methyl m(2-hydroxyethoxy)methylbenzoate.

8. The composition of claim 1 wherein X is a hydroxyethyl group.

9. A resinous polymer comprising recurring units of a monomer which is an epoxide adduct of methyl p-, or m-hydroxymethylbenzoate.

10. The polymer of claim 9 wherein the said epoxide is

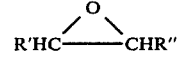

wherein R' and R" are individually selected from the group consisting of hydrogen and monovalent aliphatic groups of one to 24 carbon atoms, the said aliphatic groups being substituted and unsubstituted, the said substitutions being selected from the group consisting of hydroxyl, halo, nitrilo, amino, carbonyl, carbamato, carboxyl, aryloxy and carboxylate substituents.

11. The polymer of claim 10 wherein the said epoxide comprises ethylene oxide.

12. The polymer of claim 10 wherein the said monomer is the adduct of one mole of ethylene oxide with methyl p-hydroxymethylbenzoate.

13. The polymer of claim 10 wherein the monomer is the adduct of two moles of ethylene oxide with methyl p-hydroxymethylbenzoate.

14. The polymer of claim 10 wherein the monomer is the adduct of three moles of ethylene oxide with methyl p-hydroxymethylbenzoate.

15. The polymer of claim 10 wherein the said polymer is a copolymer of a monomer mixture comprising the adduct of one mole of ethylene oxide with methyl p-hydroxymethylbenzoate, the adduct of two moles of ethylene oxide with methyl p-hydroxymethylbenzoate, and the adduct of three moles of ethylene oxide with methyl p-hydroxymethylbenzoate.

16. A high molecular weight polyester comprising (A) a poly hydroxy and poly carboxylic acid moieties and (B) moieties selected from the group consisting of p- and m-hydroxymethylbenzoate moieties and mixtures thereof wherein (A) and (B) are present in a range of mole ratios of from 19:1 to 1:19.

17. The polyester of claim 16 wherein said poly hydroxy moiety comprises diol moieties containing 2 to 12 carbon atoms.

18. The polyester of claim 17 wherein said poly hydroxy moiety comprises ethylene glycol moieties.

19. The polyester of claim 17 wherein said poly carboxylic acid moiety comprises terephthalic acid moieties.

20. The polyester of claim 17 wherein said poly carboxylic acid moiety comprises isophthalic acid moieties.

21. The polyester of claim 17 wherein said poly carboxylic acid moiety comprises phthalic acid moieties.

* * * * *

UNITED STATES PATENT OFFICE
CERTIFICATE OF CORRECTION

Patent No. 4,220,753     Dated September 2, 1980

Inventor(s) Steven A. Cerefice and Edward E. Paschke

It is certified that error appears in the above-identified patent and that said Letters Patent are hereby corrected as shown below:

| Patent Column | Line | |
|---|---|---|
| 5 | 55 | "$C_{11}H_{14}O_{14}$" should be --$C_{11}H_{14}O_4$-- |
| 5 | 57 | "$C_{11}H_{14}H_4$" should be --$C_{11}H_{14}O_4$-- |
| 7 | 10 | "$\underline{9}$" (Table 1, 3 rd entry under Col. "$Tm°C$") should be --$\underline{a}$-- |
| 7 | 55 | "m,-hydroxymethylbenzoate" should be --m-,hydroxymethylbenzoate-- |

Signed and Sealed this

Third Day of February 1981

[SEAL]

Attest:

RENE D. TEGTMEYER

Attesting Officer     Acting Commissioner of Patents and Trademarks